(12) United States Patent
Hirao

(10) Patent No.: US 11,841,056 B2
(45) Date of Patent: Dec. 12, 2023

(54) CLUTCH CONTROL SYSTEM

(71) Applicant: SUBARU CORPORATION, Tokyo (JP)

(72) Inventor: Koichi Hirao, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/176,055

(22) Filed: Feb. 28, 2023

(65) Prior Publication Data

US 2023/0296145 A1    Sep. 21, 2023

(30) Foreign Application Priority Data

Mar. 16, 2022   (JP) .................... 2022-041275

(51) Int. Cl.
*F16D 48/06*    (2006.01)

(52) U.S. Cl.
CPC .... *F16D 48/06* (2013.01); *F16D 2500/10412* (2013.01); *F16D 2500/3063* (2013.01); *F16D 2500/3065* (2013.01); *F16D 2500/30412* (2013.01); *F16D 2500/30421* (2013.01); *F16D 2500/3166* (2013.01); *F16D 2500/50287* (2013.01)

(58) Field of Classification Search
None
See application file for complete search history.

(56) References Cited

U.S. PATENT DOCUMENTS

2007/0213177 A1    9/2007    Tamura et al.
2015/0298698 A1    10/2015   Kim et al.

FOREIGN PATENT DOCUMENTS

| JP | 2007-239724 A | 9/2007 |
| JP | 2007-314009 A | 12/2007 |
| WO | 2014/068720 A1 | 5/2014 |

*Primary Examiner* — Timothy Hannon
(74) *Attorney, Agent, or Firm* — Rimon P.C.; Tomoki Tanida

(57) ABSTRACT

A clutch control system includes a clutch, and a control unit. The control unit includes one or more processors, and one or more memories configured to store an executable instruction (s). The one or more processors are configured, in accordance with the instruction, to: acquire an engine torque; based on the engine torque, calculate a base transmission torque of the clutch; calculate a first transmission torque of the clutch by limiting, based on a first limiting condition, an amount of change of the base transmission torque; based on the first transmission torque, control the clutch; during return from a fuel cut, calculate a second transmission torque of the clutch by limiting the amount of change of the base transmission torque based on a second limiting condition that is more limiting than the first limiting condition; and, during return from the fuel cut, control the clutch based on the second transmission torque.

3 Claims, 5 Drawing Sheets

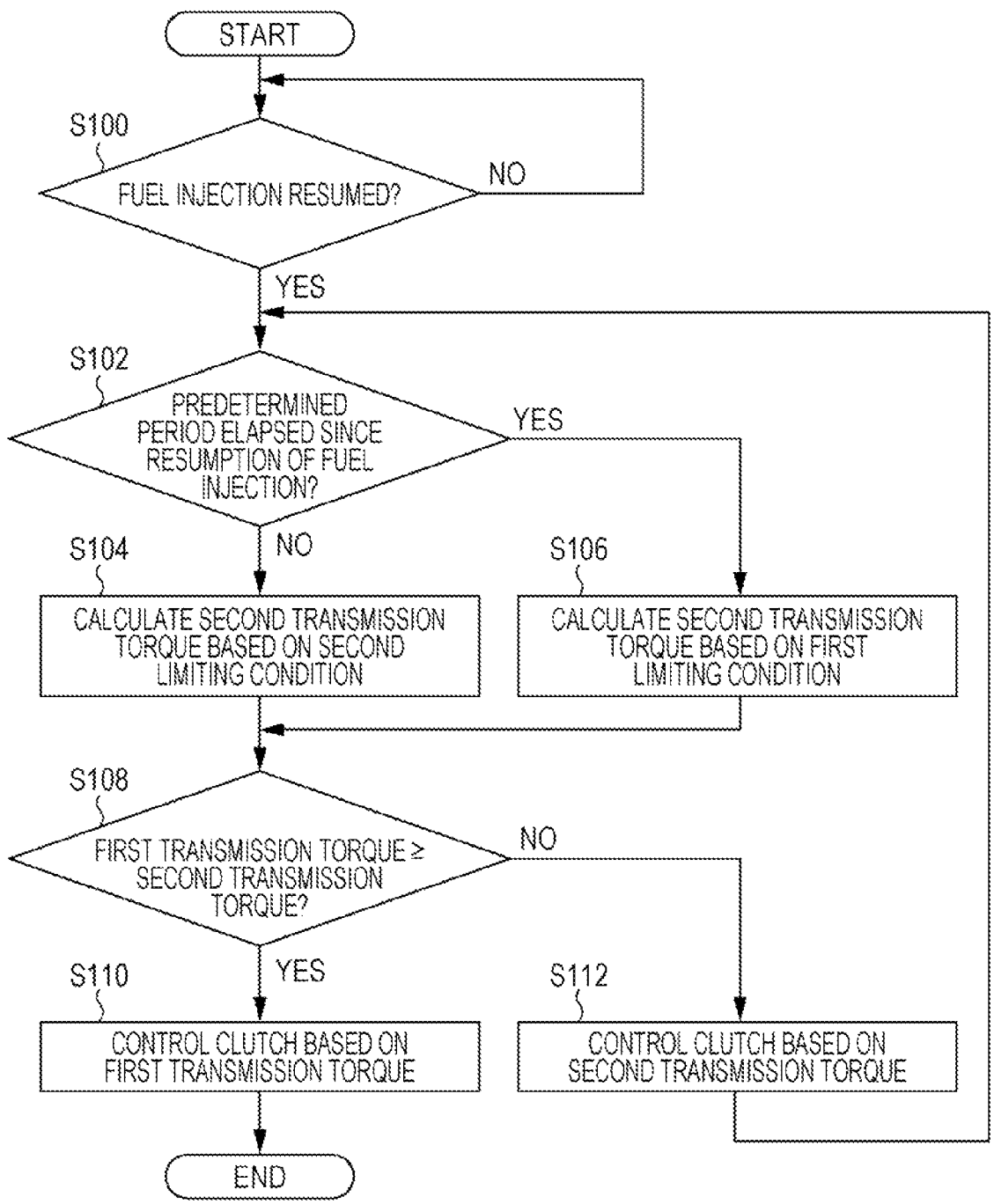

CLUTCH CONTROL SYSTEM

CROSS-REFERENCE TO RELATED APPLICATIONS

The present application claims priority from Japanese Patent Application No. 2022-041275 filed on Mar. 16, 2022, the entire contents of which are hereby incorporated by reference.

BACKGROUND

The disclosure relates to a clutch control system.

Engines used in a vehicle are designed so that, for example, for purposes such as improving fuel economy, fuel injection is sometimes stopped intentionally while the vehicle is in motion. This is also referred to as "fuel cut". If, however, an imbalance exists between the torque from the engine and the clutch torque when the vehicle returns from a fuel cut, that is, when fuel injection is resumed after a fuel cut, this may cause the clutch to slip. To address this, various techniques have been proposed to prevent the clutch from slipping during return from a fuel cut (see, for example, International Patent Application Publication WO 2014/068720 A1, and Japanese Unexamined Patent Application Publications Nos. 2007-239724 and 2007-314009).

SUMMARY

An aspect of the disclosure provides a clutch control system for a vehicle. The clutch control system includes a clutch, and a control unit. The clutch is disposed in a path of transmission between an engine and a wheel of the vehicle. The control unit is configured to control the clutch. The control unit includes one or more processors, and one or more memories configured to store one or more instructions to be executed by the one or more processors. The one or more processors are configured, in accordance with the one or more instructions, to acquire an engine torque. The one or more processors are configured, in accordance with the instruction, to, based on the engine torque, calculate a base transmission torque of the clutch. The one or more processors are configured, in accordance with the instruction, to calculate a first transmission torque of the clutch by limiting, based on a first limiting condition, an amount of change of the base transmission torque. The one or more processors are configured, in accordance with the instruction, to, based on the first transmission torque, control the clutch. The one or more processors are configured, in accordance with the instruction, to, during return from a fuel cut, calculate a second transmission torque of the clutch by limiting, based on a second limiting condition, the amount of change of the base transmission torque. The second limiting condition limits the amount of change further than does the first limiting condition. The one or more processors are configured, in accordance with the instruction, to, during return from the fuel cut, control the clutch based on the second transmission torque.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

FIGS. 3A to 3D are graphs illustrating changes in various parameters during return from a fuel cut due to accelerator turn-on;

FIGS. 4A to 4D are graphs illustrating changes in various parameters during return from a fuel cut without accelerator turn-on; and FIG. 5 is a flowchart illustrating the clutch control system according to the embodiment.

DETAILED DESCRIPTION

During return from a fuel cut, it is desirable to prevent clutch slip while reducing unnecessary clutch operation.

It is desirable to provide a clutch control system that makes it possible to, during return from a fuel cut, prevent clutch slip while reducing unnecessary clutch operation.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
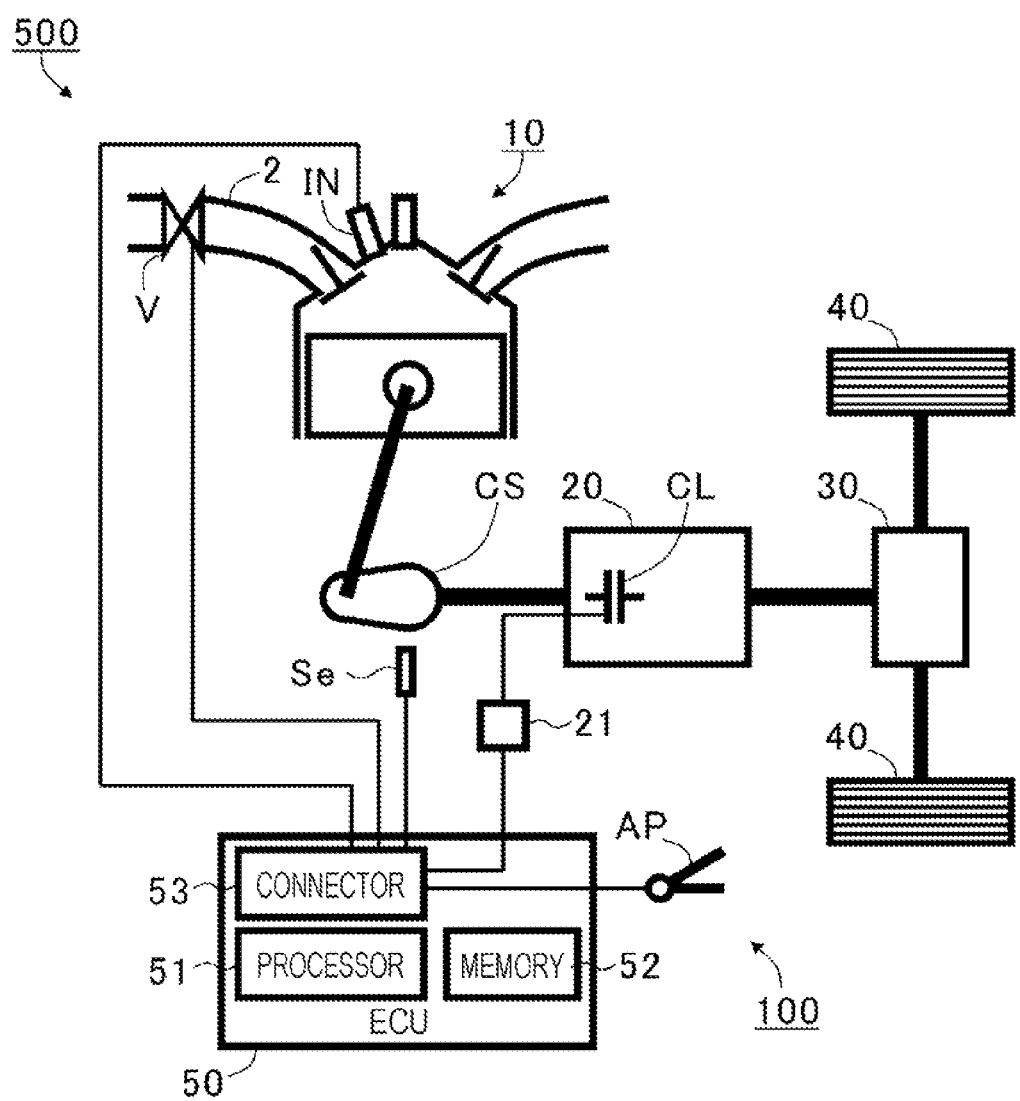
FIG. 1 schematically illustrates a clutch control system according to an embodiment.

FIG. 1 schematically illustrates a clutch control system 100 according to an embodiment of the disclosure. The clutch control system 100 may herein be also referred to simply as "system". The system 100 is applicable to, for example, a vehicle 500 such as a hybrid electric vehicle (HEV), a gasoline automobile, or a diesel automobile. According to the embodiment, the vehicle 500 is a gasoline automobile. For example, the vehicle 500 includes an engine 10, a transmission 20, a differential 30, wheels 40, and an ECU 50. In one embodiment, the ECU 50 may serve as a "control unit". The vehicle 500 may further include various other components.

The rotation speed of a crankshaft CS of the engine 10, that is, the rotation speed of the engine 10 is measured by a crank angle sensor Se. The crank angle sensor Se is communicably coupled to the ECU 50, and transmits measurement data to the ECU 50.

The engine 10 includes an injector IN for fuel. For example, the injector IN may be disposed in a combustion chamber to inject fuel into the combustion chamber (i.e., a so-called direct-injection system). In another embodiment, the engine 10 may be a premixed engine. The injector IN is communicably coupled to the ECU 50. The ECU 50 controls the amount of fuel to be injected from the injector IN.

The vehicle 500 includes an intake pipe 2 coupled to the engine 10. The intake pipe 2 is provided with a throttle valve V. The throttle valve V regulates the amount of intake air flowing through the intake pipe 2. The throttle valve V is communicably coupled to the ECU 50. The ECU 50 controls the degree of opening of the throttle valve V to regulate the amount of intake air.

The vehicle 500 includes an accelerator pedal AP. The accelerator pedal AP is communicably coupled to the ECU 50. For example, based on the amount of depression of the accelerator pedal AP, that is, accelerator position angle (hereinafter, "accelerator position"), the ECU 50 controls the degree of opening of the throttle valve V, and the amount of fuel to be injected from the injector IN.

An engine torque generated by the engine 10 is transmitted to the wheels 40 via components such as the transmission 20 and the differential 30.

The transmission 20 includes a clutch CL. The clutch CL allows or shuts off the transmission of torque from the engine 10 to the wheels 40. For example, the clutch torque of the clutch CL is regulated by an oil pressure regulator 21. For example, the oil pressure regulator 21 includes a pump, a valve, and other components. The oil pressure regulator 21 is communicably coupled to the ECU 50. The ECU 50 controls the oil pressure regulator 21 to regulate the clutch torque.

For example, the ECU 50 includes one or more processors (hereinafter, "processor") 51, one or more storage media (hereinafter, "storage medium") 52, and one or more connectors (hereinafter, "connector") 53. Examples of the processor 51 may include a CPU. Examples of the storage medium 52 may include a ROM and a RAM. The ECU 50 may further include other components. The components of the ECU 50 are coupled to each other via a bus. The storage medium 52 stores one or more programs (hereinafter, "program") to be executed by the processor 51. The program may include one or more instructions (hereinafter, "instruction") executable by the processor 51. Operation of the ECU 50 according to an embodiment of the disclosure is implemented by the processor 51 executing the instruction stored in the storage medium 52. The ECU 50 is communicably coupled to the components of the system 100 via the connector 53.

In the system 100, fuel injection is sometimes stopped intentionally while the vehicle is in motion. This is herein also referred to as "fuel cut". A fuel cut may be performed for various purposes. For example, a fuel cut may be performed to improve fuel economy. For example, one way to improve fuel economy is to stop fuel injection during deceleration. A fuel cut may be performed for purposes other than that mentioned above. When the vehicle returns from such a fuel cut, that is, when fuel injection is resumed after a fuel cut, if an imbalance exists between the torque from the engine and the clutch torque, this may cause the clutch CL to slip. According to the embodiment, during return from a fuel cut, the system 100 regulates the clutch torque to prevent clutch slip.

Figure 2:
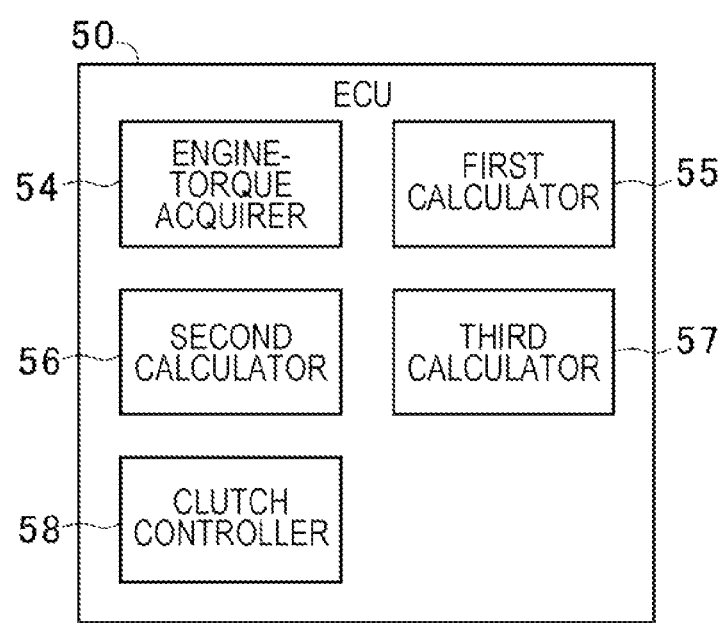
FIG. 2 illustrates the functional blocks of an electronic control unit (ECU)

FIG. 2 illustrates the functional blocks of the ECU 50. In one emborient, the processor 51 may, in accordance with the instruction stored in the storage medium 52, serve as an engine-torque acquirer 54, a first calculator 55, a second calculator 56, a third calculator 57, and a clutch controller 58.

When serving as the engine-torque acquirer 54, the processor 51 estimates, based on one or more parameters associated with the engine 10, a torque to be transmitted from the crankshaft CS to the wheels 40, that is, an engine torque ET. For example, the processor 51 may estimate the engine torque ET based on one or more of the following pieces of information: the rotation speed of the engine 10 received from the crank angle sensor Se; the degree of opening of the throttle valve V; the amount of fuel injection from the injector IN; and a combination of these values. Alternatively, the engine torque ET may be estimated by a known method.

When serving as the first calculator 55, the processor 51 calculates a base transmission torque BT of the clutch CL, based on the engine torque ET acquired by the engine-torque acquirer 54. The calculation of the base transmission torque BT will be described later in detail.

When serving as the second calculator 56, the processor 51 calculates a first transmission torque FT based on the base transmission torque BT, so that the base transmission torque BT obtained by the first calculator 55 is modified to adapt to the actual usage. As for the calculation of the first transmission torque FT as well, this will be described later in detail.

When serving as the third calculator 57, the processor 51 calculates a second transmission torque ST based on the base transmission torque BT, so that the base transmission torque BT obtained by the first calculator 55 is modified to adapt for use during return from a fuel cut. As for the calculation of the second transmission torque ST as well, this will be described later in detail.

When serving as the clutch controller 58, while the vehicle 500 is in operation, the processor 51 basically controls the clutch CL based on the first transmission torque FT calculated by the second calculator 56. During return from a fuel cut, the processor 51 controls the clutch CL based on the second transmission torque ST calculated by the third calculator 57.

FIGS. 3A to 3D are graphs illustrating changes in various parameters during return from a fuel cut due to accelerator turn-on. FIGS. 4A to 4D are graphs illustrating changes in various parameters during return from a fuel cut without accelerator turn-on. In all of FIGS. 3A to 3D and FIGS. 4A to 4D, the horizontal axis represents time.

Figure 3A:
Figure 4A:

In each of FIGS. 3A and 4A, the vertical axis represents accelerator position, that is, the amount of depression of the accelerator pedal AP.

Figure 3B:
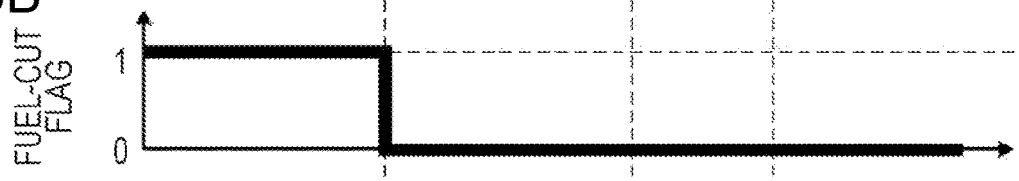
Figure 4B:
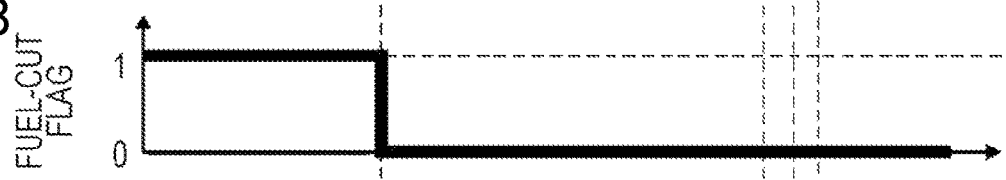

In each of FIGS. 3B and 4B, the vertical axis represents a fuel-cut flag. When the fuel-cut flag is 0, fuel is injected from the injector IN. When the fuel-cut flag is 1, a fuel cut is executed, that is, injection of fuel from the injector IN is stopped.

Figure 3C:
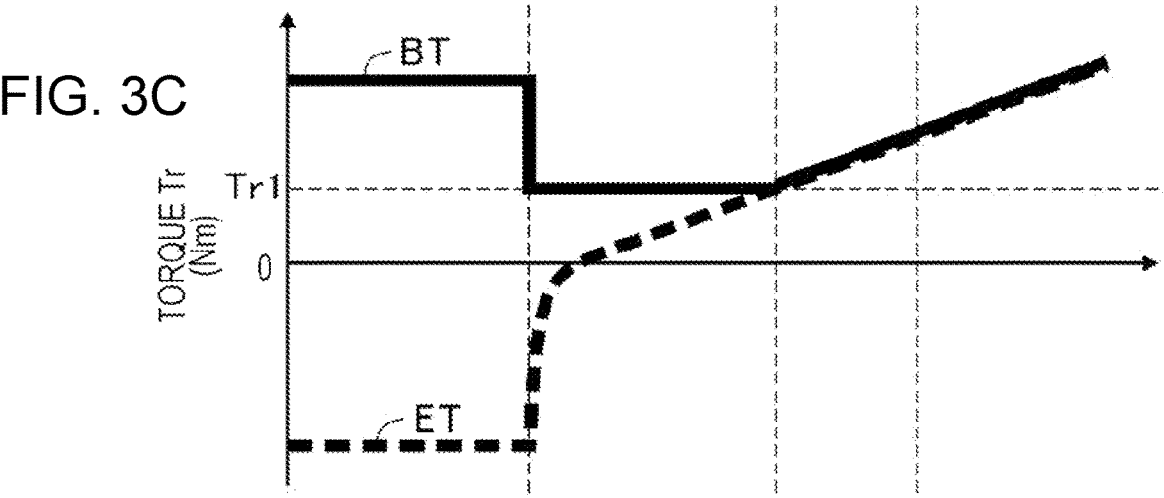
Figure 4C:
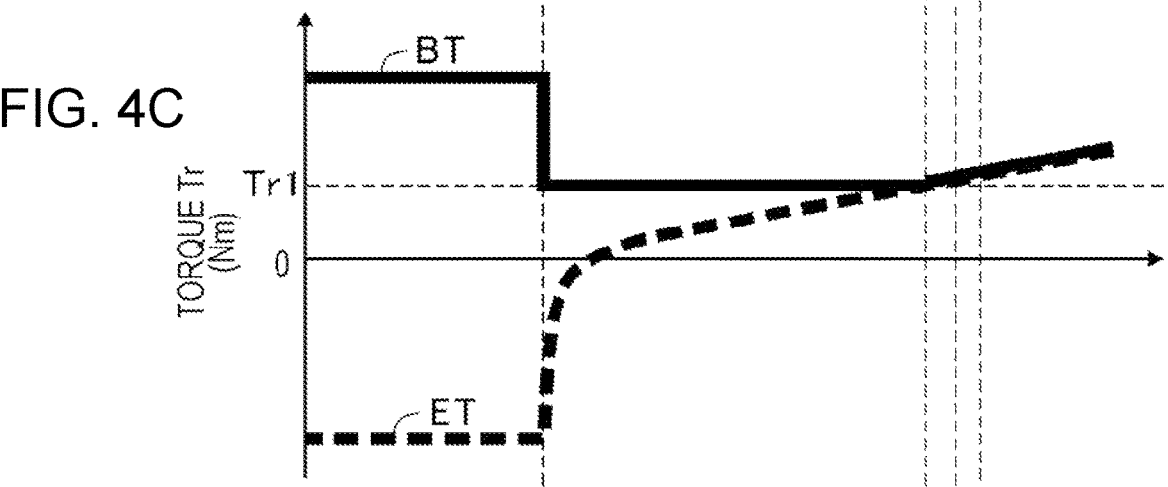

In each of FIGS. 3C and 4C, the vertical axis represents torque. In each of FIGS. 3C and 4C, the broken line represents the engine torque ET, and the solid line represents the base transmission torque BT.

Figure 3D:
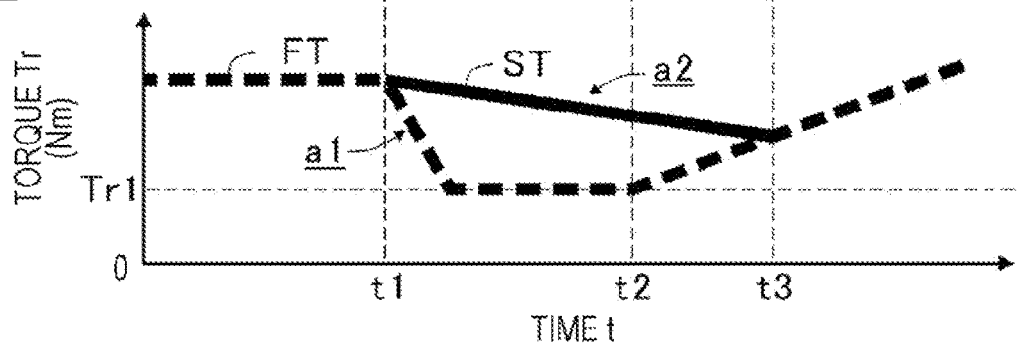
Figure 4D:
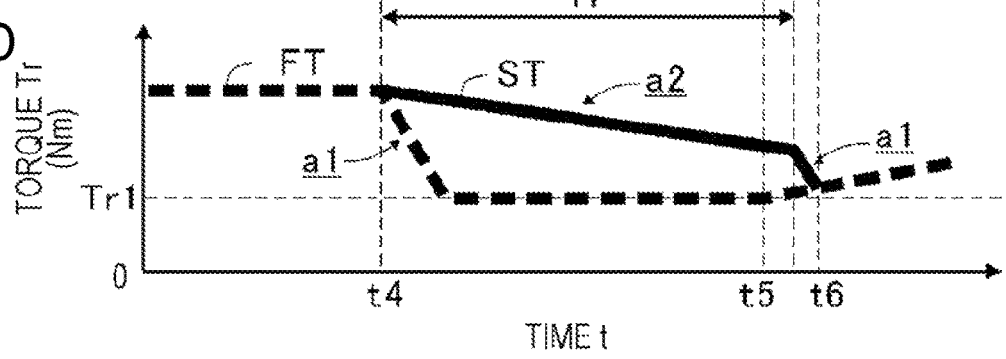

In each of FIGS. 3D and 4D, the vertical axis represents torque. In each of FIGS. 3D and 4D, the broken line represents the first transmission torque FT, and the solid line represents the second transmission torque ST.

With reference to FIG. 3A, in this example, the accelerator position is at zero before time t1, and the accelerator position increases at time t1. In this case, for example, the vehicle 500 decelerates until time t1, and accelerates from time t1.

With reference to FIG. 3B, in the period before time t1, the fuel-cut flag is 1, that is, a fuel cut is being executed. No fuel is thus injected from the injector IN. In this case, the engine 10 is rotated not by the combustion of fuel but by the torque provided from the wheels 40. Thus, as illustrated in FIG. 3C, the engine torque ET has a negative value in the period before time t1.

To prevent the clutch CL from slipping, the base transmission torque BT of the clutch CL is determined to achieve balance with the engine torque ET. For example, the base transmission torque BT is calculated as the absolute value of the engine torque ET, that is, as a positive value. This allows the engine torque ET and the clutch torque to be in balance with each other.

With reference to FIG. 3D, the first transmission torque FT is calculated based on the base transmission torque BT to allow adaptation to the actual use of the clutch CL while the vehicle 500 is in motion. In one example, the first transmission torque FT is calculated as follows. That is, as will be described later in more detail, in order to reduce abrupt changes in clutch torque, the first transmission torque FT is calculated by limiting, based on a predetermined first limiting condition, the amount of change of the base transmission torque BT. In this regard, in the period before time t1, the base transmission torque BT in FIG. 3C is constant. Consequently, as illustrated in FIG. 3D, in the period before time t1, the first transmission torque FT may be the same as the base transmission torque BT.

In the period before time t1, a fuel cut is being executed, that is, the vehicle is not in a condition where the vehicle is returning from a fuel cut. Thus, in the period before time t1, no calculation of the second transmission torque ST may be performed. In the period before time t1, the processor 51 controls the clutch CL based on the first transmission torque FT.

Returning now to FIG. 3A, at time t1, the accelerator position increases, that is, the accelerator pedal AP is depressed. The fuel-cut flag changes to 0 at this time as illustrated in FIG. 3B. Consequently, fuel is injected from the injector IN, and the engine 10 begins to rotate through combustion of the fuel. Thus, as illustrated in FIG. 3C, the engine torque ET increases from time t1 toward positive values. The engine torque ET, however, eventually crosses zero, after which the absolute value of the engine torque ET decreases. In this case, calculating the base transmission torque BT directly as the absolute value of the engine torque ET would result in the base transmission torque BT decreasing to zero even though the accelerator pedal AP is being depressed. Since the engine torque ET quickly increases after reaching zero, decreasing the base transmission torque BT to zero would result in unnecessary operation of the clutch CL. Accordingly, until the engine torque ET reaches a predetermined positive torque value Tr1, the base transmission torque BT is maintained at the torque value Tr1. In the present example, the engine torque ET reaches the torque value Tr1 at time t2. Accordingly, the base transmission torque BT is maintained at the torque value Tr1 from time t1 to time t2. The torque value Tr1 may be determined based on, for example, various factors such as the specifications of the vehicle 500. After the engine torque ET reaches the torque value Tr1 at time t2, the base transmission torque BT is calculated as the absolute value of the engine torque ET again.

With reference to FIG. 3D, as described above, in order to reduce abrupt changes in clutch torque, the first transmission torque FT is calculated by limiting, based on a predetermined first limiting condition, the amount of change of the base transmission torque BT. For example, with reference to FIG. 3C, the base transmission torque BT abruptly decreases to the torque value Tr1 at time t1. If the base transmission torque BT changes abruptly, directly using the base transmission torque BT for the control of the clutch torque may result in the clutch CL being unable to follow the base transmission torque BT. Accordingly, in order to reduce such abrupt changes, the first transmission torque FT is calculated by limiting, based on a predetermined first limiting condition, the amount of change of the base transmission torque BT. For example, as illustrated in FIG. 3D, the first limiting condition may be a limiting value a1 for the slope, denoted "a", of the graph of torque Tr with respect to time t (i.e., "a"=$\Delta$Tr/$\Delta$t). In this case, the first transmission torque FT is calculated by modifying the base transmission torque BT in such a way that the absolute value of the slope "a" is less than or equal to the absolute value of the first limiting value a1. After the first transmission torque FT decreases to the torque value Tr1, the first transmission torque FT is maintained at the torque value Tr1. The first transmission torque FT increases after the engine torque ET reaches the torque value Tr1 at time t2. Unlike a second limiting value a2 to be described later in detail, the first limiting value a1 is used throughout the motion of the vehicle 500. For example, the first limiting value a1 may be determined based on various factors such as the specifications of the vehicle 500. As the first limiting condition, various limiting conditions other than the limiting value a1 for the slope "a" mentioned above may be used.

The second transmission torque ST is calculated based on the base transmission torque BT in such a way that the base transmission torque BT in FIG. 3C is adapted for use during return from a fuel cut. As mentioned above, during return from a fuel cut, the engine torque ET crosses zero, and thus the absolute value of the engine torque ET decreases. The engine torque ET, however, quickly increases after reaching zero. Consequently, decreasing the clutch torque to the torque value Tr1 and then increasing the clutch torque, as with the case with the first transmission torque FT, may lead to unnecessary operation of the clutch CL. Therefore, according to the embodiment, the second transmission torque ST is calculated by further limiting, based on a second limiting condition, the amount of change of the base transmission torque BT. The second limiting condition limits the amount of change of the base transmission torque BT further than does the first limiting condition. According to the embodiment, the second limiting condition is a limiting value a2 for the slope "a". If the first and second limiting conditions are respectively the limiting values a1 and a2 for the slope "a", the absolute value of the second limiting value a2 is less than the absolute value of the first limiting value a1. The second transmission torque ST is calculated by modifying the base transmission torque BT in such a way that the absolute value of the slope "a" is less than or equal to the absolute value of the second limiting value a2. This configuration helps to reduce unnecessary operation of the clutch CL while preventing clutch slip. For example, the second limiting value a2 may be determined based on various factors such as the specifications of the vehicle 500. As the second limiting condition, various limiting conditions other than the limiting value a2 for the slope "a" mentioned above may be used.

In the period from time t1 to time t3 at which the first transmission torque FT becomes greater than or equal to the second transmission torque ST, the processor 51 controls the clutch CL based on the second transmission torque ST.

Subsequently, once the first transmission torque FT becomes greater than or equal to the second transmission torque ST at time t3, the processor 51 controls the clutch CL based on the first transmission torque FT again. In the period after time t3, no calculation of the second transmission torque ST may be performed.

With reference to FIG. 4A, in this example, the accelerator position is maintained at 0. In this case, for example, the vehicle 500 maintains its deceleration. If the rotation speed of the engine 10 decreases too much, then to prevent engine stalling, the fuel-cut flag changes from 1 to 0 as illustrated in FIG. 4B, and the injection of fuel is resumed without accelerator turn-on.

With reference to FIG. 4B, in the period before time t4, the fuel-cut flag is 1, that is, a fuel cut is being executed. No fuel is thus injected from the injector IN. Thus, as illustrated in FIG. 4C, the engine torque ET has a negative value in the period before time t4, as with the example illustrated in FIG. 3C. The base transmission torque BT is calculated as the absolute value of the engine torque ET. As illustrated in FIG. 4D, in the period before time t4, the first transmission torque FT may be the same as the base transmission torque BT. In the period before time t4, no calculation of the second transmission torque ST may be performed. In the period before time t4, the processor 51 controls the clutch CL based on the first transmission torque FT.

Returning to FIG. 4B, as described above, the fuel-cut flag changes from 1 to 0 at time t4. Consequently, fuel is injected from the injector IN, and the engine 10 begins to rotate through combustion of the fuel. Thus, as illustrated in FIG. 4C, the engine torque ET increases from time t4 toward positive values. As with the example in FIG. 3C, until the engine torque ET reaches a predetermined positive torque value Tr1 at time t5, the base transmission torque BT is maintained at the torque value Tr1. After the engine torque ET reaches the torque value Tr1 at time t5, the base transmission torque BT is calculated as the absolute value of the engine torque ET.

With reference to FIG. 4D, as with the example in FIG. 3D, the first transmission torque FT is calculated by modifying the base transmission torque BT in such a way that the absolute value of the slope "a" is less than or equal to the absolute value of the first limiting value a1. After the first transmission torque FT decreases to the torque value Tr1, the first transmission torque FT is maintained at the torque value Tr1. The first transmission torque FT increases after the engine torque ET reaches the torque value Tr1 at time t5. As with the example in FIG. 3D, the second transmission torque ST is calculated by modifying the base transmission torque BT in such a way that the absolute value of the slope "a" is less than or equal to the absolute value of the second limiting value a2.

In the example in FIGS. 4A to 4D, as described above, the injection of fuel is resumed without accelerator turn-on. In this case, the engine torque ET in FIG. 4C increases more slowly than in the example illustrated in FIG. 3C. Accordingly, the increase in the first transmission torque FT in FIG. 4D is likewise comparatively slow. According to the embodiment, if the first transmission torque FT does not increase to be greater than or equal to the second transmission torque ST over a predetermined period TP starting from time t4 at which the injection of fuel is resumed, then the processor 51 calculates the second transmission torque ST by limiting, based on the first limiting condition mentioned above, the amount of change of the base transmission torque BT. That is, after elapse of the predetermined period TP from time t4, the second transmission torque ST is calculated by modifying the base transmission torque BT in such a way that the absolute value of the slope "a" is less than or equal to the absolute value of the first limiting value a1. This configuration helps to prevent the amount of change of the clutch torque from being limited unnecessarily. For example, the predetermined period TP may be determined based on various factors such as the specifications of the vehicle 500.

In the period from time t4 to time t6 at which the first transmission torque FT becomes greater than or equal to the second transmission torque ST, the processor 51 controls the clutch CL based on the second transmission torque ST.

Subsequently, when the first transmission torque FT becomes greater than or equal to the second transmission torque ST at time t6, the processor 51 controls the clutch CL based on the first transmission torque FT again. In the period after time t6, no calculation of the second transmission torque ST may be performed.

Reference is now made to operation of the system 100. FIG. 5 is a flowchart illustrating the clutch control system 100 according to the embodiment. For example, the operation illustrated in FIG. 5 may be started in response to the fuel-cut flag being set to 1, that is, in response to a fuel-cut being started. It is to be noted that throughout the motion of the vehicle 500, the processor 51 is configured to, separately from the operation illustrated in FIG. 5, acquire the engine torque ET, calculate the base transmission torque BT and the first transmission torque FT, and based on the first transmission torque FT, control the clutch CL.

The processor 51 determines whether the injection of fuel has been resumed (step S100). For example, the processor 51 determines whether the fuel-cut flag has been changed from 1 to 0. If it is determined at step S100 that the injection of fuel has not been resumed (NO), the processor 51 repeats step S100 at predetermined intervals.

If it is determined at step S100 that the injection of fuel has been resumed (YES), the processor 51 determines whether a predetermined period TP has elapsed since the resumption of fuel injection (step S102).

If it is determined at step S102 that the period TP has not elapsed (NO), the processor 51 calculates, based on the second limiting value a2, the second transmission torque ST (step S104).

If it is determined at step S102 that the period TP has elapsed (YES), the processor 51 calculates, based on the first limiting value a1, the second transmission torque ST (step S106).

Subsequently, the processor 51 determines whether the first transmission torque FT has increased to be greater than or equal to the second transmission torque ST (step S108). If it is determined at step S108 that the first transmission torque FT has increased to be greater than or equal to the second transmission torque ST (YES), the processor 51 controls the clutch CL based on the first transmission torque FT (step S110), and ends the series of operational steps. Thereafter, the processor 51 controls the clutch CL based on the first transmission torque FT.

If it is determined at step S108 that the first transmission torque FT has not increased to be greater than or equal to the second transmission torque ST (NO), the processor 51 controls the clutch CL based on the second transmission torque ST (step S112), and repeats steps S102 to S112.

The system 100 that has been described above includes the clutch CL, and the ECU 50. The clutch CL is disposed in a path of torque transmission between the engine 10 and the wheels 40. The ECU 50 is configured to control the clutch CL. The ECU 50 includes one or more processors 51, and one or more storage media 52 configured to store an instruction to be executed by the one or more processors 51. The one or more processors 51 are configured, in accordance with the instruction, to: acquire the engine torque ET; based on the engine torque EQ, calculate the base transmission torque BT of the clutch CL; calculate the first transmission torque FT of the clutch CL by limiting, based on the first limiting condition a1, an amount of change of the base transmission torque BT; based on the first transmission torque FT, control the clutch CL; during return from a fuel cut, calculate the second transmission torque ST of the clutch CL by limiting, based on the second limiting condition a2, the amount of change of the base transmission torque BT, the second limiting condition a2 limiting the amount of change further than does the first limiting condition a1; and during return from the fuel cut, control the clutch CL based on the second transmission torque ST. As previously mentioned, the configuration described above makes it possible to, during return from a fuel cut, prevent clutch slip while reducing unnecessary operation of the clutch CL.

In the system 100, the one or more processors 51 are further configured, in accordance with the instruction, to, during return from the fuel cut, control the clutch CL based on the first transmission torque FT in response to the first transmission torque FT increasing to be greater than or equal to the second transmission torque ST. This configuration helps to prevent the amount of change of the clutch torque from being limited unnecessarily.

In the system 100, the one or more processors 51 are further configured, in accordance with the instruction, to, in a case where the predetermined period TP has elapsed since resumption of fuel injection, calculate the second transmission torque ST of the clutch CL by limiting, based on the first limiting condition, the amount of change of the base transmission torque BT. This configuration helps to prevent the amount of change of the clutch torque from being limited unnecessarily.

Although an embodiment of the disclosure has been described above with reference to the attached drawings, this is not intended to limit the disclosure to the embodiment described above. It will be readily appreciated that those skilled in the art would be able to arrive at various modifications or alterations within the scope of the claims, and such modifications or alterations are also considered to be within the technical scope of the disclosure. The steps to be executed by the ECU 50 according to the embodiment described above may be executed in any order other than as exemplarily disclosed herein, as long as no technical inconsistencies arise.

For example, according to the embodiment described above, the system 100 controls the clutch CL inside the transmission 20. In another embodiment, the system 100 may control any clutch disposed in the path of torque transmission between the engine 10 and the wheels 40, for example, a clutch inside a torque converter.

The foregoing description of the embodiment is directed to an exemplary situation when the vehicle 500 returns from a fuel cut during deceleration. The above-mentioned control of the clutch CL, however, is applicable to various other situations when the vehicle 500 returns from a fuel cut. For example, in another embodiment in which the vehicle 500 is a HEV, the vehicle 500 may return from a fuel cut also when the power source is to be changed from the motor to the engine. In this case as well, the system 100 may control the clutch CL in a manner similar to that described above.

The ECU 50 illustrated in FIG. 2 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the engine-torque acquirer 54, the first calculator 55, the second calculator 56, the third calculator 57, and the clutch controller 58. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 2.

The invention claimed is:

1. A clutch control system for a vehicle, the clutch control system comprising:
    a clutch disposed in a path of transmission between an engine and a wheel of the vehicle; and
    a control unit configured to control the clutch,
    the control unit comprising
        one or more processors, and
        one or more memories configured to store one or more instructions to be executed by the one or more processors,
    the one or more processors being configured, in accordance with the one or more instructions, to
        acquire an engine torque,
        based on the engine torque, calculate a base transmission torque of the clutch,
        calculate a first transmission torque of the clutch by limiting, based on a first limiting condition, an amount of change of the base transmission torque,
        based on the first transmission torque, control the clutch,
        during return from a fuel cut, calculate a second transmission torque of the clutch by limiting, based on a second limiting condition, the amount of change of the base transmission torque, the second limiting condition limiting the amount of change further than does the first limiting condition, and
        during return from the fuel cut, control the clutch based on the second transmission torque.

2. The clutch control system according to claim 1, wherein the one or more processors are further configured, in accordance with the instruction, to, during return from the fuel cut, control the clutch based on the first transmission torque in response to the first transmission torque increasing to be greater than or equal to the second transmission torque.

3. The clutch control system according to claim 1, wherein the one or more processors are further configured, in accordance with the instruction, to, when a predetermined period of time has elapsed since resumption of fuel injection, calculate the second transmission torque of the clutch by limiting, based on the first limiting condition, the amount of change of the base transmission torque.

* * * * *